(12) United States Patent
Dobson et al.

(10) Patent No.: US 10,964,236 B2
(45) Date of Patent: Mar. 30, 2021

(54) WET SURFACE INDICATION

(71) Applicant: Oxford University Innovation Limited, Oxford (GB)

(72) Inventors: Peter James Dobson, Oxford (GB); Leonard Pincher, Norwich (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 16/323,935

(22) PCT Filed: Jul. 19, 2017

(86) PCT No.: PCT/GB2017/052123
§ 371 (c)(1),
(2) Date: Feb. 7, 2019

(87) PCT Pub. No.: WO2018/029437
PCT Pub. Date: Feb. 15, 2018

(65) Prior Publication Data
US 2019/0180657 A1 Jun. 13, 2019

(30) Foreign Application Priority Data

Aug. 10, 2016 (GB) ...................... 1613776

(51) Int. Cl.
*B32B 3/00* (2006.01)
*G09F 19/22* (2006.01)
(Continued)

(52) U.S. Cl.
CPC .............. *G09F 19/228* (2013.01); *B32B 5/00* (2013.01); *B32B 5/22* (2013.01); *E04B 5/46* (2013.01);
(Continued)

(58) Field of Classification Search
CPC combination set(s) only.
See application file for complete search history.

(56) References Cited

U.S. PATENT DOCUMENTS

| 4,810,562 A | 3/1989 | Okawa et al. |
| 6,416,853 B1 | 7/2002 | Nakashima et al. |

(Continued)

FOREIGN PATENT DOCUMENTS

| FR | 3 004 203 A1 | 10/2014 |
| GB | 2509338 A | 7/2014 |

(Continued)

OTHER PUBLICATIONS

International Search Report for PCT/GB2017/052123, dated Sep. 6, 2017, pp. 1-2.
UK Search Report for GB1613776.2, dated Feb. 6, 2017, pp. 1-4.

*Primary Examiner* — Elizabeth E Mulvaney
(74) *Attorney, Agent, or Firm* — Thomas|Horstemeyer, LLP

(57) ABSTRACT

A product (20) for use on a surface or as part of a surface, the product comprising: a first layer (22) which carries an indication; and a second layer (26) which overlies at least a portion of the first layer (22), the second layer (26) comprising a porous polymer; wherein the second layer (26) is opaque when dry such that the indication is masked and transparent when wet such that the indication is revealed.

17 Claims, 3 Drawing Sheets

Figure 1A:
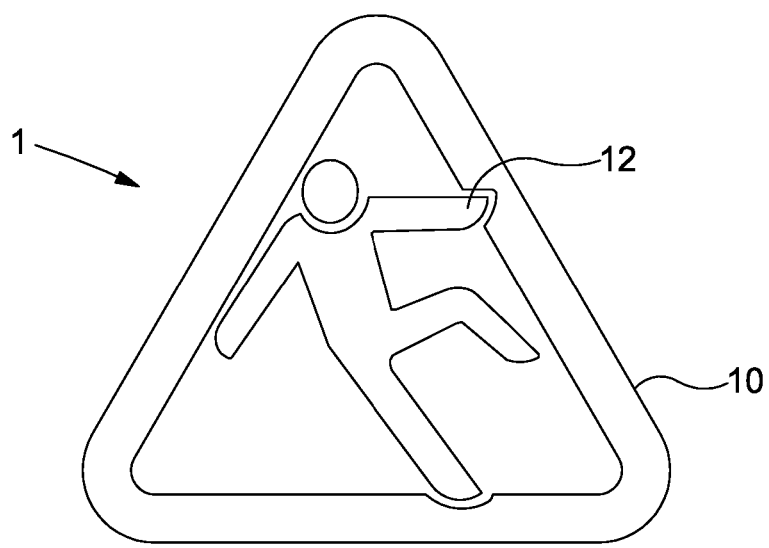

(51) Int. Cl.
  *B32B 5/22*    (2006.01)
  *E04F 15/02*   (2006.01)
  *G01N 21/81*   (2006.01)
  *E04B 5/46*    (2006.01)
  *B32B 5/00*    (2006.01)

(52) U.S. Cl.
  CPC ....... *E04F 15/02172* (2013.01); *G01N 21/81* (2013.01)

(56) References Cited

U.S. PATENT DOCUMENTS

| | | | |
|---|---|---|---|
| 6,479,102 B1 | 11/2002 | Hunter et al. | |
| 8,845,230 B2 * | 9/2014 | Drago | A43B 3/0084 40/594 |
| 8,993,102 B2 * | 3/2015 | Shipway | E04C 2/546 428/195.1 |
| 8,997,682 B1 | 4/2015 | Ashcroft | |
| 9,228,103 B2 * | 1/2016 | Shipway | E04C 2/546 |
| 9,606,098 B2 * | 3/2017 | Winterowd | G01N 33/46 |
| 2019/0298584 A1 * | 10/2019 | Mayfield | B32B 5/02 |

FOREIGN PATENT DOCUMENTS

| | | |
|---|---|---|
| JP | H01250554 A | 10/1989 |
| JP | 2010 282138 A | 12/2010 |
| WO | 2015/069513 A1 | 5/2015 |

\* cited by examiner

WET SURFACE INDICATION

CROSS-REFERENCE TO RELATED APPLICATIONS

This application is the National Stage of International Application No. PCT/GB2017/052123, filed Jul. 19, 2017, which claims the priority to GB 1613776.2, filed Aug. 10, 2016, which are entirely incorporated herein by reference.

This invention relates to wet surface indication. For instance, the invention relates primarily, but not exclusively, to a floor covering providing improved safety.

Wet surfaces, e.g. floors or pavements, can be a safety hazard since water underfoot poses a risk of slippage. It is common to place a warning sign, such as a cone or A-board, on a wet surface to caution those in the area. This approach has a number of drawbacks including the need to have a store of such warning signs in the vicinity and for someone to notice that the surface is wet and then take action to locate and place the warning sign in the area before an accident occurs.

Spillages of flammable liquids, such as petrol (gasoline) can be especially dangerous. Such spillages can occur on petrol station forecourts and should be cleaned up as soon as possible.

Water is also known to collect on flat roofs, and can damage the structure over time.

The present invention has been devised with the foregoing in mind.

In a first aspect of the invention there is provided a product for use on a surface or as part of a surface, the product comprising:

a first layer which carries an indication; and a second layer which overlies at least a portion of the first layer, the second layer comprising a porous polymer;

wherein the second layer is opaque when dry such that the indication is masked and transparent when wet such that the indication is revealed.

The product can be employed to monitor the presence of a liquid. This is useful in a range of applications. For example, the product can be employed on or as part of a floor to reduce the hazard associated with wet floors. Alternatively, a wall or wall covering comprising the product could be used to monitor humidity.

The product may be employed as a floor covering, in which case it would lie horizontally. However, the product could also be useful in other orientations, e.g. vertically as a wall covering or at an angle as part of a sloping or pitched roof.

The product may be permanently fixed to a surface, e.g. the product may form a floor, roof, wall etc. Alternatively, the product may be temporarily placed, and/or fixed, on to a surface, e.g. the product could be a mat which may be placed on a floor or an adhesive sticker that is placed on a floor or a wall.

The product may be employed in or on bedding, e.g. in hospitals or care homes, to indicate visually when a given bed is wet and needs changing.

The product can be considered to be a laminated product i.e. a laminate.

The first layer displays an indication and can therefore convey a warning that there is a wet surface. The first layer can be considered to be an information layer. The indication is displayed as soon as the second layer becomes wet and does not require human intervention e.g. the placing of a warning sign.

The indication may include text, e.g. warning text such as "Caution—wet floor" or an address for a webpage. The text may be in English or another language. However this information will only be conveyed if a person can read the message.

Figure 1B:
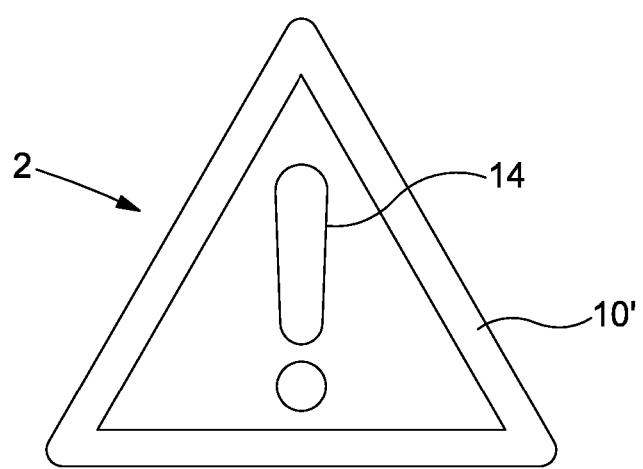

The indication may include a symbol. For example, a diagram indicating that there is a hazard, examples of which are shown in FIGS. 1A and 1B. A symbol is very useful since it can be readily understood regardless of language.

The indication may include a code such as a bar code, especially a two-dimensional bar code (commonly known as a QR code). Such codes can be employed to provide a link to a webpage. The webpage can provide further information, such as a recorded audio message or it could trigger a text message to be sent.

The first layer displays an indication. In embodiments, the indication may be printed on or adhered to a substrate such that the indication and the substrate together form the first layer. In embodiments, the indication is part of a substrate, e.g. an indication may be inlaid.

The material for the first layer is not particularly limited. In embodiments, the first layer may comprise one or more of wood, metal, linoleum, ceramic, fabric, concrete and polymer. In embodiments, the first layer may be a polymer layer, such as a vinyl layer (e.g. polyvinyl chloride) or a cast layer of polyurethane or epoxy resin or a combination thereof.

In embodiments, the first layer may have an adhesive backing to allow it to be affixed to a surface.

The second layer is opaque when dry and transparent when wet. It will be understood that the terms "transparent" and "opaque" refer to the transmission of visible light.

The refractive index n of a material is a dimensionless number that describes how light propagates through that medium. It is defined as:

$$n = c/v$$

where c is the speed of light in a vacuum (approximately $3.00 \times 10^8$ m/s) and v is the phase velocity of light in the medium.

In embodiments, the second layer employs a polymer having a refractive index of at least 1.3 and a porous structure. The porous structure allows fluids to be absorbed into the pores. When the pores are filled with air, the difference between the refractive index of the polymer (n≥1.3) and the refractive index of air (refractive index n=1) results in most of the light being scattered so that the layer appears opaque. When the pores are filled with water (n=1.33) the difference in the refractive indices (Δn) is reduced and most of the light is transmitted, rendering the layer transparent.

The refractive index of the polymer can be modified depending on the liquid to be absorbed into the pores. For the best opaque to transparent contrast the porous polymer should have a refractive index that approaches that of the liquid to be absorbed into the pores. Examples of such liquids include water (n=1.33), petrol/gasoline (n=1.40), diesel (n=1.46) and vegetable oil (n=1.47).

In a series of embodiments, the second layer comprises a porous polymer that has a refractive index of at least 1.35, at least 1.4, at least 1.45 or at least 1.5 and/or a refractive index of no more than 1.8, no more than 1.7, no more than 1.6, no more than 1.5 or no more than 1.4.

In embodiments, the porous polymer has a refractive index of from 1.3 to 1.4. This may be especially effective for water.

In practice, the inventors have found that a second layer comprising a porous polymer having a refractive index of 1.45 may be effective for warning of the presence of both water and petrol.

In embodiments, the porous polymer may have a refractive index from 1.3 to 1.7 or from 1.4 to 1.5.

The porous polymer may comprise an acrylic resin. The commercially available product Hydrochromic white C-1224 (Matsui Shikiso Chemical Company, Ltd, Japan) is said to comprise acrylic resin. The commercially available product SFXC Hydrochromic Wet and Reveal Ink (Good Life Innovations Ltd, Plymouth, United Kingdom) is said to contain acrylic resin.

In embodiments, the porous polymer may comprise polyalginate and/or hydroxyl propyl cellulose (HPC). Polyalginate is a hydrophilic polymer so it is especially effective for absorbing water. In one such embodiment the polyalginate polymer may be a polyalginate-glutaraldehyde membrane. Such membranes are described in Vieira EFS et al (J Applied Polymer Science vol 118, 857-865 (2010)).

In embodiments, the porous polymer may comprise, or consist essentially of, polydimethylsiloxane (PDMS, n=1.4035). This is a rubbery material so it can be especially useful for flooring.

In embodiments, the porous polymer may comprise a fluorinated polymer such as polytetrafluoroethylene (PTFE, n~1.35), polyvinyl fluoride (PVF), polyvinylidene fluoride (PVDF, n~1.42), fluorinated ethylene propylene (FEP, n~1.34) or polyethylenetetrafluoroethylene (ETFE).

The second layer can be considered to be a hydrochromic layer. The inventors did consider employing cobalt chloride, which is blue in its anhydrous state and pink in its fully hydrated state. Cobalt chloride could be embedded into the second layer and might be considered to provide a similar effect. However, this approach was rejected due to the risk of the coloured compound leaching in use. The inventors recognised that a physical change would provide a more reliable, repeatable change in appearance than the chemical change of cobalt chloride.

The porosity of the porous polymer can be described by reference to the size of the pores, the number of pores and/or the volume percentage of voids (pores). In embodiments the average (mean) size of the pores may be at least 0.1 microns and/or up to 2 microns (μm).

In embodiments the porosity is generated by means of phase separation, i.e. the use of a second material (e.g. a volatile liquid) that evaporates to generate cavities in the polymer.

Porosity can be generated using conventional methods, such as those described in "Nanoporous polymeric materials: a new class of materials with enhanced properties" by B Notario et al Progress in Materials Science 78/79 (2016) 93-139 and "Formation of microporous polymeric membranes via thermally induced phase separation: A review" by M Liu et al Front. Chem. Sci. Eng. 10 (2016) 57-75.

In embodiments, the porous polymer may exhibit a hexagonal array of micrometric pores, a so-called "honeycomb" structure. Such a structure may be obtained by the Breath Figure method, which is described in P Escale et al. European Polymer Journal 48, (2012) 1001-1025.

In embodiments, the porous polymer may have an open-pored structure similar to natural sponge or reticulated polyurethane.

Optionally, a transparent layer may be located between the first and second layers. This layer must be transparent so that the indication on (or in) the first layer can be seen when the second layer is wet. The transparent layer may be an adhesive that is employed to bind the first and second layers together. The choice of transparent layer may depend on the first layer to which it is applied.

Typically, the transparent layer may be a transparent polymer layer. Suitable transparent polymers include PDMS, PMMA, PET, polycarbonate, PVC etc.

Optionally, a wear layer may be located on the second layer. The wear layer must allow liquid to reach the second layer whist providing wear resistance. When the product is employed as or on flooring the wear layer may also provide an anti-slip effect. This is particularly useful if the second layer is slippery, e.g. if the second layer comprises PTFE.

The wear layer must allow liquid to reach the second layer, e.g. it must be discontinuous or permeable. In embodiments, the wear layer may cover at least 0.5%, at least 1% or at least 2% of the second layer and/or no more than 50%, no more than 30% or no more than 20% of the area of the second layer.

The material for the wear layer is not particularly limited so long as it provides the necessary wear resistance and allows liquid to reach the second layer. In embodiments the wear layer may comprise a polymer layer. In embodiments, the wear layer may be a substantially transparent layer, since this will improve visibility of the indication on (or in) the first layer.

The thickness of the wear layer (when present) may be compared with the thickness of the second layer. In embodiments, the wear layer has a thickness that is greater than the thickness of the second layer. In other embodiments, the wear layer has a thickness that is less than the thickness of the second layer.

In embodiments, the wear layer may comprise a mesh. By its nature, a mesh is discontinuous, i.e. the mesh material covers less than 100% of the area of the second layer, and thereby allows liquid to access the second layer. The mesh may be in the form of a repeated pattern of shapes or combinations of shapes that tessellate e.g. squares, rectangles, diamonds, hexagons (a honeycomb pattern) etc. The mesh may be considered to be a net or a grid. In embodiments the mesh material may cover at least 0.5%, at least 1% or at least 2% of the second layer and/or no more than 50%, no more than 30% or no more than 20% of the area of the second layer.

In embodiments, the wear layer may comprise an arrangement of protrusions e.g. studs. The protrusions may extend from the second layer and thereby protect it. In embodiments, the protrusions may be metal or polymer studs.

In a second aspect of the invention there is provided a method for the manufacture of the product of the first aspect, the method comprising providing a first layer carrying an indication; and
  optionally covering at least a portion of the first layer with a transparent layer;
  coating at least a portion of the first layer or a portion of the transparent layer with a second layer;
  wherein the second layer comprises a porous polymer that is opaque when dry such that the indication is masked and transparent when wet such that the indication is revealed.

In embodiments, the transparent layer may comprise a polymer. In embodiments, covering at least a portion of the first layer with a transparent layer may comprise coating the first layer with a polymer that dries to form the transparent layer.

In embodiments, coating at least a portion of the first layer or a portion of the transparent layer with the second layer may comprise coating with a composition comprising a polymer and a solvent, wherein the solvent evaporates to generate porosity in the polymer.

In embodiments, coating at least a portion of the first layer or a portion of the transparent layer with the second layer may comprise applying a layer of polymer having porosity present therein.

In embodiments, the second layer may be printed onto the first layer or onto the transparent layer when present. In particular embodiments the second layer may be screen-printed onto the first layer or the transparent layer when present.

In embodiments, the method may additionally comprise the step of applying a wear layer to the second layer.

The comments above in relation to the first aspect of the invention apply equally here. For example, in embodiments the second layer may comprise a porous polymer having a refractive index of at least 1.3.

In a third aspect of the present invention there is provided a method for monitoring the presence of liquid comprising:
providing the product of the first aspect in a first location;
taking images of the product using a camera; and
transmitting the images to a second location.

Advantageously, the method may be employed to monitor spillages remotely. As explained above, the product of the first aspect displays an indication when wet. This indication will be visible from an image taken using the camera and thereby provides means for remotely monitoring the presence of liquid.

In embodiments, the liquid may be water (n=1.33). In embodiments, the liquid may be an aqueous liquid such as a beverage. Suitable beverages include milk (n=1.35), tea, coffee, fruit juice, beer and wine. In embodiments, the liquid may be an organic liquid, such as alcohol (1.36), petrol (gasoline n=1.40), diesel (n=1.46), or vegetable oil.

In embodiments, the liquid may have a refractive index of at least 1.2, at least 1.25, at least 1.3, at least 1.35 or at least 1.4 and/or no more than 1.6, no more than 1.5 or no more than 1.4.

Typically, the image(s) may be taken using a digital camera and then transmitted electronically. The digital camera can be a standalone camera or part of a gadget, e.g. a mobile telephone, tablet, laptop etc. The camera may be internet enabled, such that the image(s) may be transmitted via the internet.

In embodiments an image may be taken and then transmitted at least once every hour, at least once every minute, or at least once every 10 seconds. Images may be taken as often as desired and may be taken continuously to provide a film.

The camera and means for transmitting images may be provided by closed circuit television (CCTV). For example, a spillage in a supermarket aisle could be easily observed on CCTV from a control room. The liquid itself may not be visible to the naked eye, unlike the warning provided by the wet product.

In embodiments, the product may be provided on or as a surface, typically flooring, within a building, e.g. within a supermarket, hospital, shopping mall or office block.

In embodiments, the product may be provided on or as a surface, typically flooring, within a vehicle such as a ship, a submarine, an aeroplane, a helicopter, a bus or a lorry or within a structure such as an oil rig or a viewing platform.

In embodiments, the product may be provided on or as part of a roof of a building, such as a warehouse or fuel store. This is especially useful for a flat roof since water may collect on the roof and will not be observed from the ground.

In embodiments, the product may be provided on or as a road surface.

In embodiments, the product may be provided on or as an external surface of a vehicle or structure such as a deck of a ship, an oil rig, a viewing platform, a walkway, a staircase, ramp or ladder, e.g. a mobile staircase, ramp or ladder.

In embodiments, the camera may be located on an aircraft, e.g. an unmanned aerial vehicle such as a drone. This may be useful for monitoring in inhospitable conditions and/or at hard-to-reach or remote locations.

In a fourth aspect there is a provided a kit comprising the product of the first aspect, a camera for taking images of the product and means for transmitting the images.

In a fifth aspect there is provided a method for maintaining a surface, the method comprising:
providing the product of the first aspect on a surface or as part of a surface; and observing the product and noting whether the indication is masked or visible.

Optionally, the method may comprise taking no action when the indication is masked.

The method may comprise taking action to dry the product when the indication is visible.

The fifth aspect provides a method of maintaining a surface, such as flooring, a roof, a road, bedding etc. It is possible to observe whether the indication is visible or masked directly in the immediate vicinity or remotely (e.g. using the method of third aspect). If the indication is visible, then the surface is wet and this problem can be addressed, e.g. by mopping a floor or dehumidifying a room. An advantage of the method is that action may be taken only when necessary.

It will be understood that features of the first aspect can be applied to the second, third, fourth and fifth aspects of the invention.

Embodiments of the invention will now be described, by way of example only, with reference to the accompanying drawings, in which:

FIG. 1 shows hazard symbols;
FIG. 2 is a schematic diagram of a product in accordance with an embodiment of the invention; and
FIG. 3 is a schematic diagram showing a method for monitoring the presence of liquid employing the product of FIG. 2.

Referring to FIG. 1A there is shown an indication in the form of a hazard symbol 1 comprising a triangle 10 and within the triangle, a schematic image of a person slipping 12. Referring to FIG. 1B there is shown an indication in the form of a hazard symbol 2 again comprising a triangle 10' and, within the triangle 10' an exclamation mark 14.

Figure 2A:
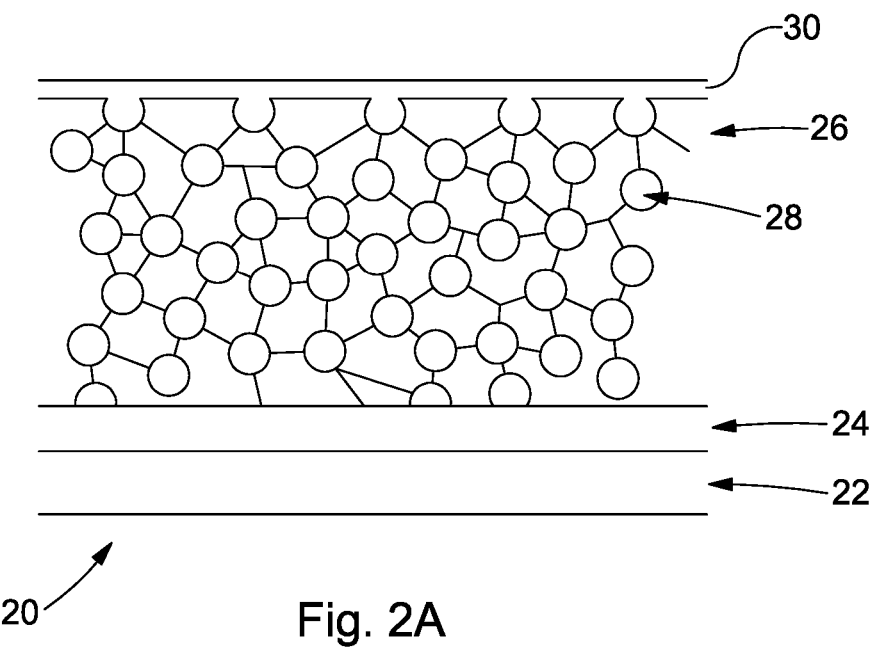
Figure 3:
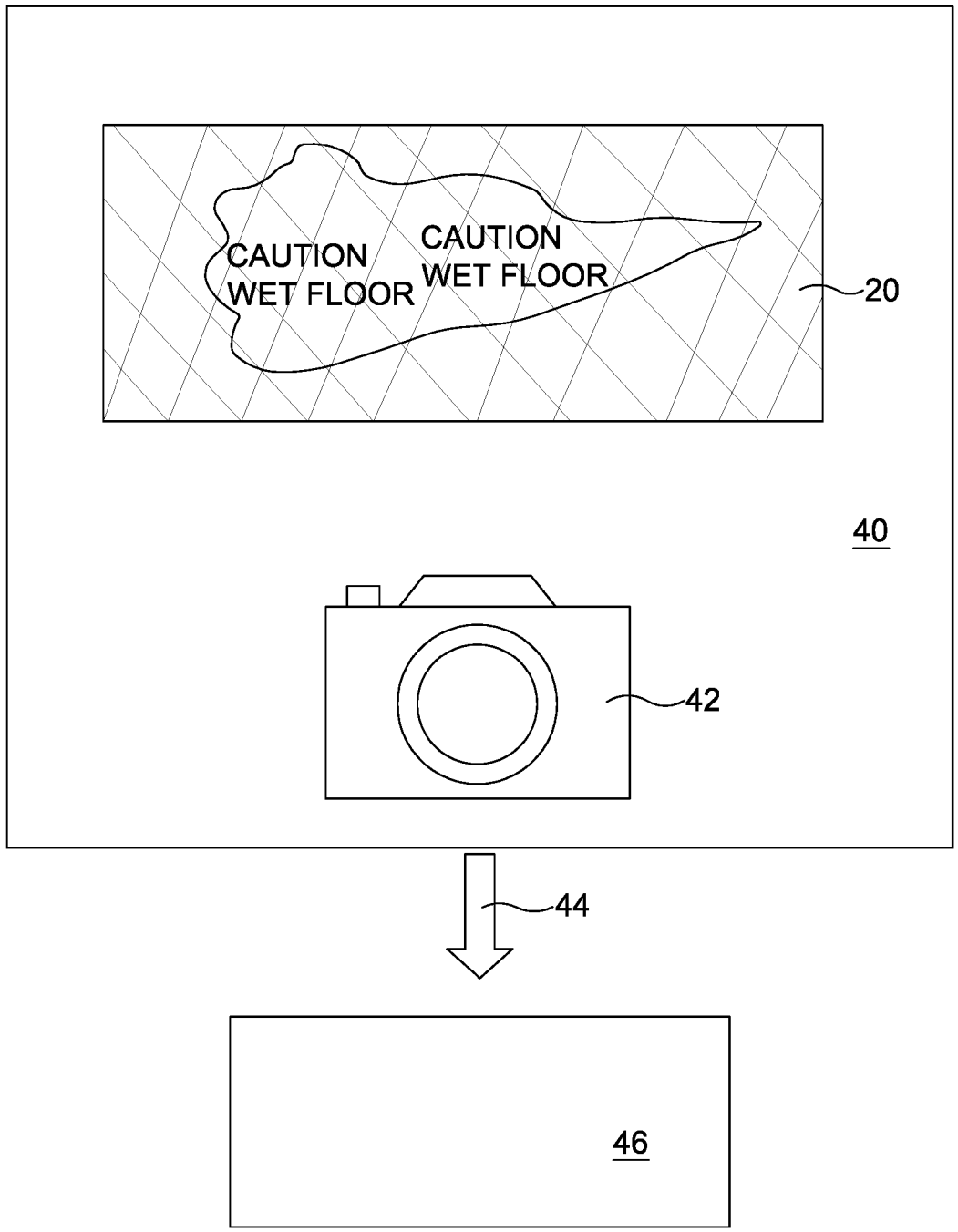

Referring to FIG. 2A there is shown a schematic diagram of a cross-section of a laminated product 20 in accordance with an embodiment of the invention. The laminated product 20 comprises a first layer 22 which is a vinyl layer on which an indication has been printed (not visible in this view). A transparent layer 24 is located between the first layer 22 and a second layer 26. The second layer 26 is a porous polymer layer having a refractive index of 1.45. The polymer defines pores 28 having a diameter of from 0.1 to 2 microns. A hardwearing polymer mesh 30 is applied to the second layer 26 to provide wear resistance whilst also allowing liquid to reach the pores 28. The transparent layer is suitable for receiving the second layer, which conveniently may be printed on to the transparent layer.

Figure 2B:
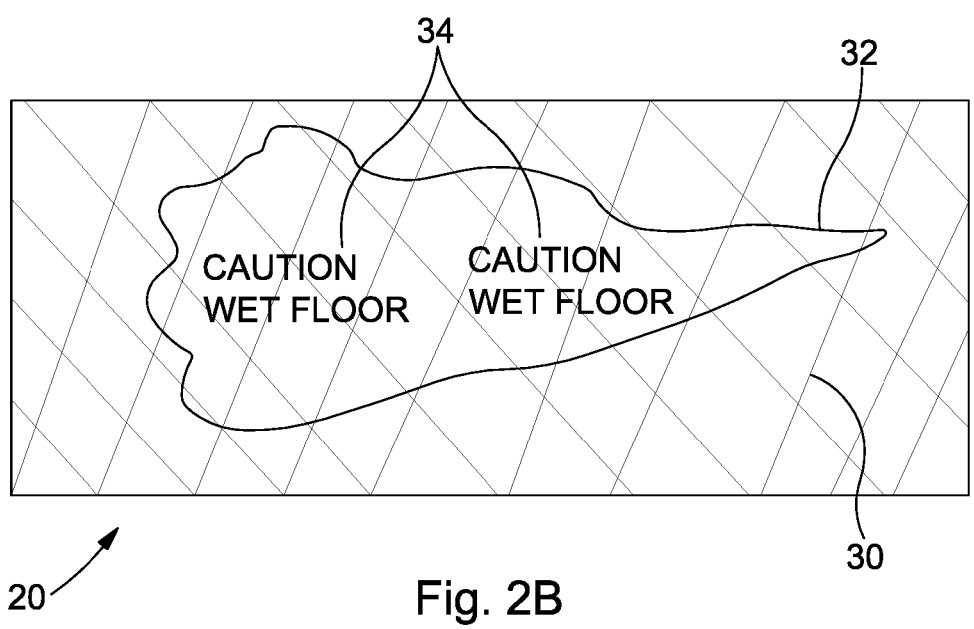

Referring to FIG. 2B there is shown a schematic diagram of the product of FIG. 2A from above. The product 20 is shown with a small spillage of water 32, through which the indication 34 is visible. In this case the indication 34 includes a repeating pattern of text that states "Caution Wet Floor". It will be understood that the text could be replaced on supplemented with a symbol (such as those in FIG. 1) or a barcode or a QR code. The mesh 30 is in the form of a diamond shaped grid and provides resistance to wear whilst still allowing the image to be visible.

The inventors employed the commercially available products "SFXC Water Based Wet And Reveal Tycote" and "SFXC Water Based Wet And Reveal Ink" (both Good Life Innovations Ltd, Plymouth, United Kingdom) to produce the transparent layer 24 and the second layer 26.

A method for monitoring the presence of liquid is described with reference to FIG. 3. FIG. 3 shows the product 20 of FIG. 2 installed in a first location 40. A camera 42 is also present at the first location and is employed to take images of the product 20.

The images are then transmitted (as indicated by arrow 44) to a second location 46. Hence, the condition of the surface (e.g. floor, roof, wall covering, bedding etc.) can be monitored remotely. If the indication is visible, this indicates that the surface is wet and appropriate action can be taken to dry the surface.

The invention claimed is:

1. A product for use on a surface, the product comprising a first layer which carries an indication; and
a second layer which overlies at least a portion of the first layer, the second layer comprising a porous polymer;
wherein the second layer is opaque when dry such that the indication is masked and transparent when wet such that the indication is revealed; and
a wear layer is located on the second layer, wherein the wear layer covers at least 0.5% of the area of the second layer, or the wear layer comprises a mesh or an arrangement of protrusions, or both.

2. The product of claim 1, wherein the indication comprises text, a symbol and/or a code.

3. The product of claim 2, wherein the code comprises a bar code or a QR code.

4. The product of claim 1, wherein the porous polymer has a refractive index of at least 1.3 and/or no more than 1.8.

5. The product of claim 4, wherein the porous polymer has a refractive index from 1.3 to 1.7 or from 1.4 to 1.5.

6. The product of claim 1, wherein the porous polymer comprises an acrylic resin, polyalginate and/or hydroxyl propyl cellulose and/or a fluorinated polymer.

7. The product of claim 1, wherein the mean size of the pores is from 0.1 to 2 µm.

8. The product of claim 1, wherein a transparent layer is located between the first and second layers.

9. A surface, a floor, a floor covering, a wall, a wall covering, bedding, a roof or a road surface comprising the product of claim 1.

10. A method for the manufacture of the product of claim 1, the method comprising:
providing the first layer carrying an indication;
optionally covering at least a portion of the first layer with a transparent layer;
coating the first layer or the transparent layer with the second layer;
wherein the second layer comprises the porous polymer that is opaque when dry such that the indication is masked and transparent when wet such that the indication is revealed.

11. The method of claim 10, wherein the second layer is printed onto the first layer or onto the transparent layer when present.

12. A method for monitoring the presence of a liquid comprising:
providing the product of claim 1 in a first location;
taking images of the product using a camera; and
transmitting the images to a second location.

13. The method of claim 12, wherein the liquid is an aqueous liquid or an organic liquid, and/or wherein the liquid has a refractive index of at least 1.2.

14. The method of claim 12, wherein an image is taken by the camera and then transmitted at least once every hour.

15. The method of claim 12, wherein the first location is within a building, vehicle or structure, on an external surface of a building, vehicle or structure, on a roof or on a road.

16. A kit comprising the product of claim 1, a camera for taking images of the product and means for transmitting the images.

17. A method for maintaining a surface, the method comprising:
providing the product of claim 1 on a surface or as part of a surface; and
observing the product and noting whether the indication is masked or visible.

* * * * *